US011488153B2

(12) United States Patent
D'Souza et al.

(10) Patent No.: US 11,488,153 B2
(45) Date of Patent: Nov. 1, 2022

(54) TOKEN-BASED SYSTEM FOR SECURING AND RECOVERING DATA

(71) Applicant: The Toronto-Dominion Bank, Toronto (CA)

(72) Inventors: Roy D'Souza, Oakville (CA); Jonathan K. Barnett, Oakville (CA); Roisin F. Fritz, Toronto (CA); John Jong Suk Lee, Waterloo (CA); Paul Mon-Wah Chan, Markham (CA); Orin Del Vecchio, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 1307 days.

(21) Appl. No.: 15/286,625

(22) Filed: Oct. 6, 2016

(65) Prior Publication Data

US 2017/0132617 A1 May 11, 2017

Related U.S. Application Data

(60) Provisional application No. 62/251,664, filed on Nov. 5, 2015.

(51) Int. Cl.
*G06Q 20/38* (2012.01)
*G06Q 20/28* (2012.01)
(Continued)

(52) U.S. Cl.
CPC ......... *G06Q 20/3829* (2013.01); *G06Q 20/28* (2013.01); *G06Q 20/385* (2013.01);
(Continued)

(58) Field of Classification Search
CPC ........ G06Q 20/30–39; G06Q 20/20–29; H04L 9/30–39
(Continued)

(56) References Cited

U.S. PATENT DOCUMENTS

| 8,036,941 | B2 | 10/2011 | Bennett et al. |
| 8,108,303 | B2 | 1/2012 | Moran |
| 8,140,442 | B2 | 3/2012 | Heyer |
| 8,688,594 | B2 | 4/2014 | Thomas et al. |
| 2003/0056108 | A1* | 3/2003 | Mont .................... G06F 21/645 713/193 |

(Continued)

OTHER PUBLICATIONS

How Computers Work 7th Ed (Year: 2003).*

*Primary Examiner* — Mohammad A. Nilforoush
*Assistant Examiner* — Cristina Owen Sherr
(74) *Attorney, Agent, or Firm* — Graham Patent Law

(57) ABSTRACT

A message processing server includes a message processor and a database of multi-layer tokens. Each token in the database includes a plurality of encrypted data layers. The first layer includes the second layer and a first pointer. The second layer includes a second pointer. The message processor is configured to receive a first authorization message including a first cryptographic key and a second value; decrypt the first layer of one of the tokens with the first key; validate the first pointer by receiving confirmation of the first pointer pointing to a database entry comprising the second value; receive a second authorization message including a second cryptographic key and a third value; decrypt the second layer of the token with the second key; and validate the second pointer by receiving confirmation of the second pointer pointing to a database entry comprising a maximum data value not less than the third value.

16 Claims, 7 Drawing Sheets

(51) Int. Cl.
    *H04L 9/32*         (2006.01)
    *G06Q 20/40*      (2012.01)
    *H04L 9/14*         (2006.01)
    *H04L 9/30*         (2006.01)
    *H04L 9/08*         (2006.01)

(52) U.S. Cl.
    CPC ......... *G06Q 20/401* (2013.01); *H04L 9/0861* (2013.01); *H04L 9/14* (2013.01); *H04L 9/30* (2013.01); *H04L 9/3215* (2013.01); *H04L 9/3226* (2013.01); *H04L 9/3247* (2013.01); *G06Q 2220/00* (2013.01); *H04L 2209/56* (2013.01)

(58) Field of Classification Search
    USPC .......................................................... 705/71
    See application file for complete search history.

(56) References Cited

U.S. PATENT DOCUMENTS

| | | |
|---|---|---|
| 2005/0204128 A1 | 9/2005 | Aday |
| 2007/0058548 A1* | 3/2007 | Babonneau ............. H04L 47/10 370/235.1 |
| 2007/0169175 A1 | 7/2007 | Hall |
| 2008/0183593 A1 | 7/2008 | Dierks |
| 2008/0244721 A1 | 10/2008 | Barrus |
| 2009/0198991 A1* | 8/2009 | Owens .................. G06F 21/575 713/2 |
| 2010/0106649 A1* | 4/2010 | Annan ................. G06Q 20/326 705/67 |
| 2015/0032626 A1* | 1/2015 | Dill ........................ G06Q 20/40 705/44 |
| 2015/0127524 A1 | 5/2015 | Jacob |
| 2016/0085955 A1 | 3/2016 | Lerner |
| 2016/0247151 A1 | 8/2016 | Gupta |

* cited by examiner

TOKEN-BASED SYSTEM FOR SECURING AND RECOVERING DATA

RELATED APPLICATIONS

This patent application claims the benefit of the filing date of U.S. patent application Ser. No. 62/251,664, filed Nov. 5, 2015, the contents of which are incorporated herein by reference.

FIELD OF THE INVENTION

This patent application relates to a method and network for accessing encrypted data.

BACKGROUND

In a high-value financial transaction (e.g. purchase of home, land or business) involving offers from multiple buyers, the seller may prefer an offer that does not include financing conditions, or a buyer who has secured pre-approved financing.

Moran (U.S. Pat. No. 8,108,303) describes a web portal for approval of a loan of a pre-determined amount to be used to purchase a home. When the loan is approved, the portal issues a card that signifies to the seller or the seller's representative that the buyer has been approved for a pre-determined loan amount.

SUMMARY

This patent application discloses a message processing server and associated method that uses multi-layer tokens to secure and recover data.

In accordance with a first aspect of the disclosure, there is provided a message processing server that includes a message processor and a token database of multi-layer tokens. Each multi-layer token includes a plurality of encrypted data layers. The first encrypted data layer of each token includes the second encrypted data layer and a second data pointer. The second encrypted data layer of each token includes a first data pointer.

The message processor is configured to (i) receive a first authorization message that includes a first cryptographic key and a second data value; (ii) derive a first decrypted data layer from one of the multi-layer tokens by decrypting the first encrypted data layer with the first cryptographic key; and (iii) validate the first data pointer of the first decrypted data layer by receiving confirmation of the first data pointer pointing to a database entry comprising the second data value.

The message processor is also configured to (iv) receive a second authorization message that includes a second cryptographic key and a third data value; (v) derive a second decrypted data layer from the one multi-layer token by decrypting the second encrypted data layer of the first decrypted data layer with the second cryptographic key; and (vi) validate the second data pointer of the second decrypted data layer by receiving confirmation of the second data pointer pointing to a database entry comprising a maximum data value not less than the third data value.

In accordance with a second aspect of the disclosure, there is provided a method of securing and recovering data from a token database of multi-layer tokens. Each multi-layer token includes a plurality of encrypted data layers. The first encrypted data layer of each token includes the second encrypted data layer and a first data pointer. The second encrypted data layer of each token includes a second data pointer.

The method involves a message processor receiving a first authorization message that includes a first cryptographic key. The message processor derives a first decrypted data layer from one of the multi-layer tokens by decrypting the first encrypted data layer with the first cryptographic key. The message processor also validates the first data pointer of the first decrypted data layer by receiving confirmation of the first data pointer pointing to a database entry comprising the second data value.

The method further involves the message processor receiving a second authorization message that includes a second cryptographic key and a third data value. The message processor derives a second decrypted data layer from the multi-layer token by decrypting the second encrypted data layer of the first decrypted data layer with the second cryptographic key. The message processor also validates the second data pointer of the second decrypted data layer by receiving confirmation of the second data pointer pointing to a database entry comprising a maximum data value that is not less than the third data value.

As will become apparent, although a customer can use the multi-layer token to complete a transaction that involves a series of payments, the multi-layer token and associated method and message processing server also allows a person to secure confidential information and to control the recovery of that information.

BRIEF DESCRIPTION OF THE DRAWINGS

An exemplary message processing network, message processing server, and method of securing and recovering data will now be described, with reference to the accompanying drawings, in which.

DETAILED DESCRIPTION

Message Processing Network-Overview

Figure 1:
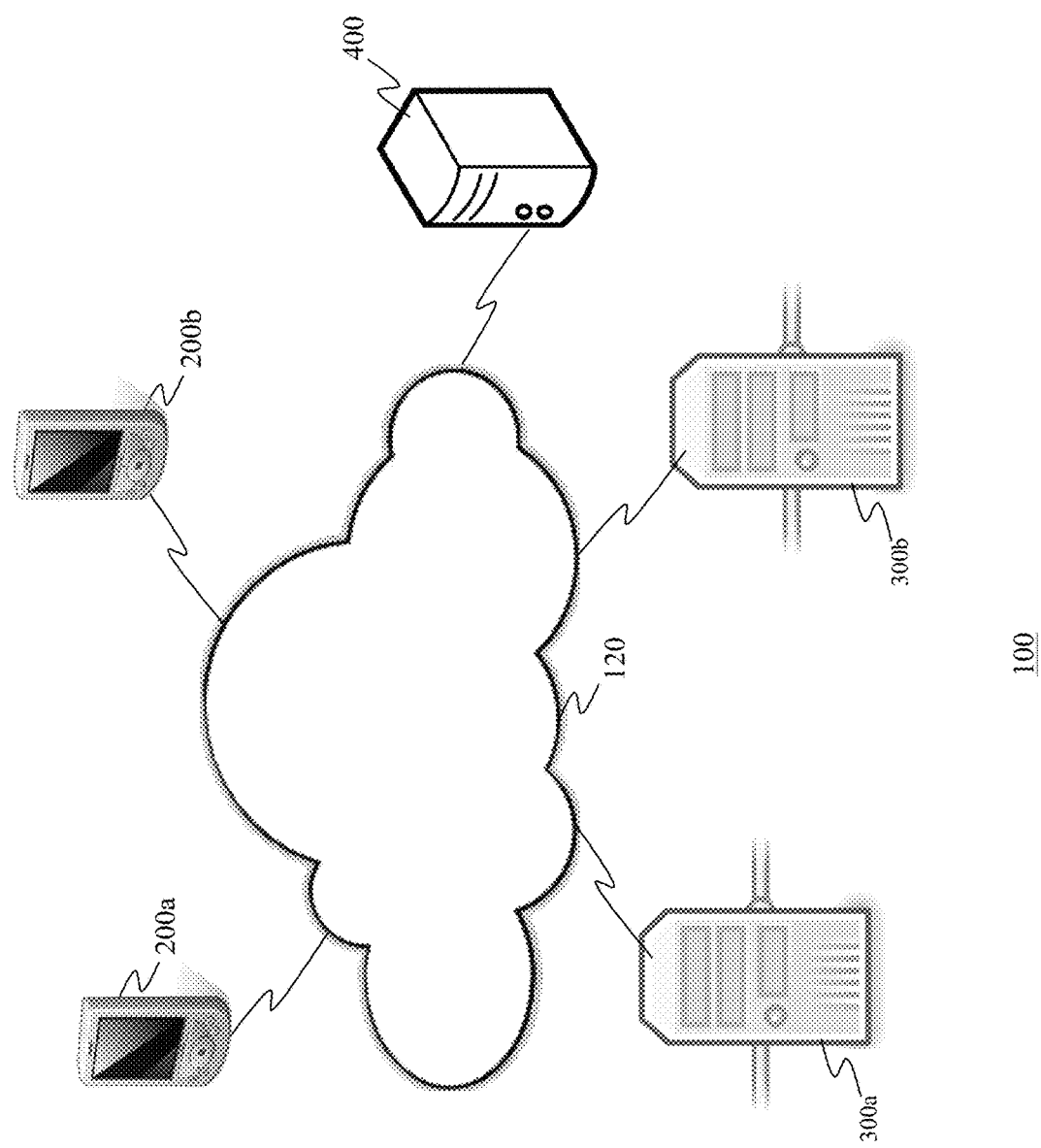
FIG. 1 is a schematic view of the message processing network, depicting a message processing server and a plurality of communications devices.

FIG. 1 is a schematic view of a message processing network, denoted generally as 100. As shown, the message processing network 100 comprises a first communications device 200a, a second communications device 200b (collectively, communications devices 200), a payer financial institution server 300a, a payee financial institution server 300b (collectively, financial institution servers 300), and a message processing server 400.

Although the message processing network 100 is shown comprising only two communications devices 200 and only two financial institution servers 300, the message processing network 100 typically comprises a plurality of the communications devices 200 and a plurality of the financial institution servers 300. Moreover, although the message processing network 100 is shown comprising only a single message processing server 400, the message processing network 100 may include a plurality of the message processing servers 400.

The communications devices 200 communicate with the message processing server 400 via a wide area network 120, such as the Internet. One or more of the communications devices 200 may be implemented as a wireless communications device configured to operate within a wireless network. As non-limiting examples, one or more of the wireless communications device 200 could be implemented as a wireless-enabled tablet computer, a wireless-enabled PDA, or a smart phone. Accordingly, the wide area network 120 may include a mobile communications network that is configured as a WiFi network, a cellular network, or a combination thereof.

Each financial institution server 300 is associated with and is administered by a respective financial institution, and is configured to communicate with the message processing server 400 and the other financial institution server(s) 300 via the wide area network 120. Each financial institution server 300 maintains a secure accounts database that includes groups of related database records. In one example, each records group is uniquely associated with a respective financial account of one of its customers, and identifies an account number of the associated financial account, and the credit/deposit entries to the associated financial account.

Each financial institution server 300 also maintains a database of registered users of the associated financial institution. In one example, the database saves, for each registered user, authentication credentials (e.g. user identifier, user authentication code (e.g. password, passcode)) that allow the associated user to authenticate to the financial institution server 300.

The message processing server 400 may be implemented as a computer server, and is configured to (i) receive a first authorization message that includes a first cryptographic key and a second data value; (ii) derive a first decrypted data layer from the first cryptographic key and a multi-layer token 250 (see FIG. 3); and (iii) validate a first data pointer of the first decrypted data layer by receiving confirmation of the first data pointer pointing to a database entry comprising the second data value.

The message processing server 400 is also configured to (iv) receive a second authorization message that includes a second cryptographic key and a third data value; (v) derive a second decrypted data layer from the second cryptographic key and the multi-layer token; and (vi) validate a second data pointer of the second decrypted data layer by receiving confirmation of the second data pointer pointing to a database entry comprising a maximum data value not less than the third data value.

A person may use the multi-layer token 250 and the message processing server 400 to secure confidential information and to control the subsequent recovery of that information. Alternately, a person may use the multi-layer token 250 to effect a funds transfer from a payer account to a payee account. The payer account and the payee account may comprise any of a savings account, a chequing account, a credit account, a line of credit account and a loyalty points account.

The payer account may be maintained by the payor financial institution server 300*a*, and the payee account may be maintained by the payee financial institution server 300*b*. Alternately, the payer account and the payee account may be maintained by a common financial institution server 300. Independently of the number of financial institution servers 300 used to maintain the payer account and the payee account, the message processing server 400 acts as a trusted intermediary to the financial institution server(s) 300.

Communications Device

Figure 2:
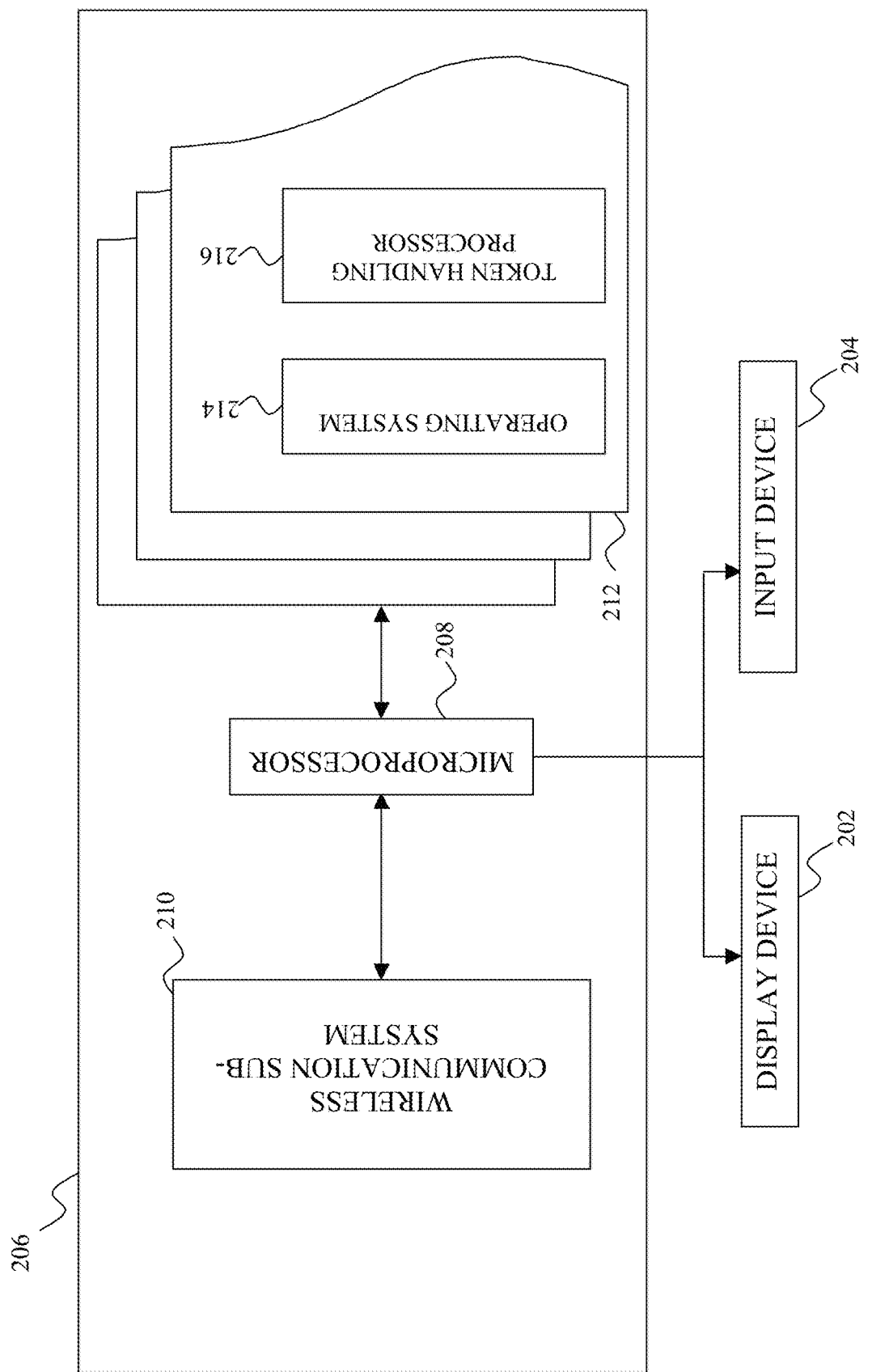
FIG. 2 is a schematic view of one of the communications devices.

A sample communications device 200 is depicted in FIG. 2. As shown, the mobile communications device 200 includes a display 202, user input device 204, and a data processing system 206. The user input device 204 may be provided as a keyboard, biometric input device (e.g. microphone) and/or a touch-sensitive layer provided on the display 202. The data processing system 206 comprises a microprocessor 208, a wireless communication sub-system 210 and a tangible non-transient computer-readable medium 212.

The communication sub-system 210 allows the mobile device 200 to communicate with the wireless network of the wide area network 120. As discussed, the wireless network may be configured as a WiFi network, a cellular network, or a combination thereof. Accordingly, the communication sub-system 210 allows the mobile device 200 to transmit and receive wireless communications signals over WiFi networks and/or cellular networks.

The computer-readable medium 212 typically comprises non-volatile electronic computer memory that stores computer processing instructions which, when accessed from the memory 212 and executed by the microprocessor 208, implement an operating system 214 and a token handling processor 216. The operating system 214 is configured to display output on the display 202, to receive user input from the input device 204, and to send and receive communication signals over the wireless network.

The operation of the token handling processor 216 will be discussed in greater detail below. However, it is sufficient at this point to note that the token handling processor 216 is configured to receive a multi-layer token 250 or a pointer to a multi-layer token 250 for a proposed high-value financial transaction, and to transmit the token (or pointer) to another communications device to effect a payment from a payer financial institution to a payee financial institution.

Multi-Layer Token

As discussed, a person may use a multi-layer token 250 (and the message processing server 400) to secure confidential information and to control the subsequent recovery of that information. Alternately, a person may use a multi-layer token 250 (and the message processing server 400) to effect a funds transfer from a payer account to a payee account.

Figure 3:
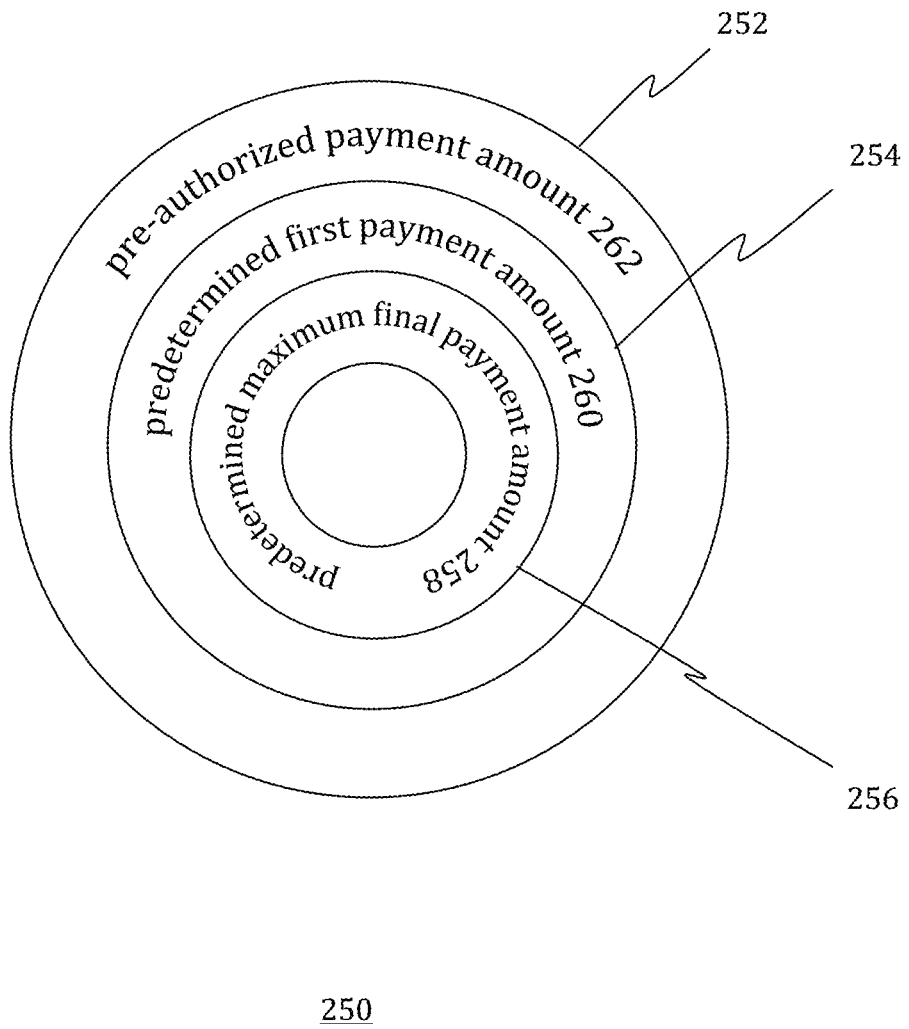
FIG. 3 is a logical representation of one of the multi-layer tokens.

As shown in FIG. 3, each multi-layer token 250 includes a plurality of data segments, configured in a hierarchical arrangement, such that each "parent" data segment includes at least one "child" data segment and any additional transaction data that may be required to effect a particular step of the transfer from the payer account to the payee account. In the embodiment shown, the multi-layer token 250 comprises a hierarchical arrangement of encrypted data segments (encrypted data "layers"), for example a first encrypted data segment ("middle" data layer) 254, a second encrypted data segment ("innermost" data layer) 256, and optionally also a primary encrypted data segment ("outermost" data layer) 252.

In this implementation, the second encrypted data segment ("innermost" data layer) 256 includes a (second) data pointer to a database that more store a maximum data value (e.g. predetermined maximum final payment amount) 258. The second data pointer of the second encrypted data segment 256 may identify a payer financial institution, and a payer account that is maintained by the payer financial institution server 300*a* and has (or will have by the closing date of the financial transaction) an available balance equal to the maximum data value 258.

In the implementation depicted in FIG. 3, the first encrypted data segment ("middle" data layer) 254 includes the second encrypted data segment ("innermost" data layer) 256 and a (first) data pointer to a database that stores a second data value (e.g. predetermined first payment amount) 260. The first data pointer of the first encrypted data segment 254 may identify the second data value 260, a payer financial institution, and a payer account that is maintained by the payer financial institution server 300a and has an available balance equal to the second data value 260.

The payer financial institution identified by the first data pointer of the first encrypted data segment 254 is typically the same payer financial institution as that identified by the second data pointer of the second encrypted data segment 256. However, the multi-layer token 250 is not so limited; the first data pointer of the first encrypted data segment 254 may identify a payer financial institution that is different from the payer financial institution identified by the second data pointer of the second encrypted data segment 256.

In the implementation depicted in FIG. 3, the primary encrypted data segment ("outermost" data layer) 252 includes the first encrypted data segment ("middle" data layer) 254 and identifies a reference data value (e.g. pre-authorized payment amount) 262. The reference data value 262 is at least equal to the sum of the maximum data value 258 (specified by the second encrypted data segment 256) and the second data value 260 (specified by the first encrypted data segment 254).

Since the first encrypted data segment ("middle" data layer) 254 includes the second encrypted data segment ("innermost" data layer) 256 and the first data pointer to a database storing the second data value 260, the primary encrypted data segment ("outermost" data layer) 252 therefore also includes the second encrypted data segment ("innermost" data layer) 256 and the first data pointer to the database storing the second data value 260.

Message Processing Server

Figure 4:
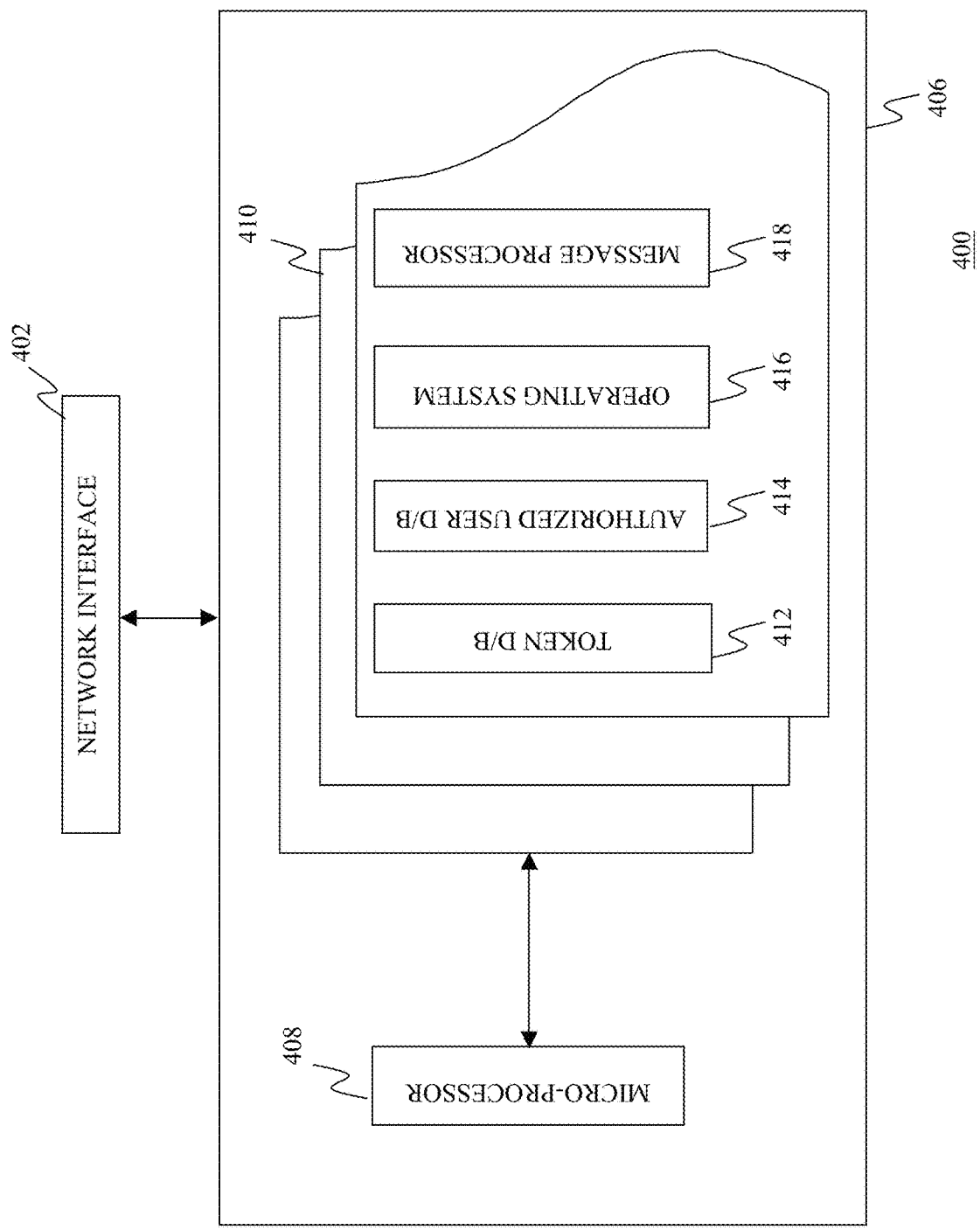
FIG. 4 is a schematic view of the message processing server.

As shown in FIG. 4, the message processing server 400 includes a network interface 402, and a data processing system 406 that is coupled to the network interface 402. The network interface 402 interfaces the message processing server 400 with the financial institution server(s) 300 via the wide area network 120.

The data processing system 406 may include one or more microprocessors 408 and a tangible non-volatile computer-readable medium 410. The computer-readable medium 410 may be provided as electronic computer memory (e.g. flash memory) or optical or magnetic memory (e.g. compact disc, hard disk).

The computer-readable medium 410 may maintain a token database 412 and an authorized user database 414. The token database 412 includes groups of related database records. Each records group is uniquely associated with a respective multi-layer token 250, and typically stores the multi-layer token 250 and one or more associated cryptographic keys.

As discussed above, each multi-layer token 250 may include a second encrypted data segment 256, a first encrypted data segment 254, and optionally also a primary encrypted data segment 252. Each data segment 252, 254, 256 may be encrypted using a respective cryptographic key that is uniquely associated with the respective data segment. Accordingly, in one example, each records group of the token database 412 may include a master cryptographic key K0 associated with the primary encrypted data segment 252, a first cryptographic key K1 associated with the first encrypted data segment 254, and a second cryptographic key K2 associated with the second encrypted data segment 256.

Each cryptographic key K0, K1, K2 may be a symmetric cryptographic key that is used to generate and decrypt the associated data segment. Therefore, the master cryptographic key K0 may be used to generate and decrypt the primary encrypted data segment 252, the first cryptographic key K1 may be used to generate and decrypt the first encrypted data segment 254, and the second cryptographic key K2 may be used to generate and decrypt the second encrypted data segment 256.

Alternately, one or more of the cryptographic keys K0, K1, K2 may be a private cryptographic key of an asymmetric cryptographic key pair. Each private cryptographic key may be used to generate the associated data segment, and each corresponding public cryptographic key may be used to decrypt the associated data segment. Therefore, the master token private cryptographic key K0 may be used to generate the primary encrypted data segment 252, the first token private cryptographic key K1 may be used to generate the first encrypted data segment 254, and the second token private cryptographic key K2 may be used to generate the second encrypted data segment 256. A master token public cryptographic key K0' may be used to decrypt the primary encrypted data segment 252, a first token public cryptographic key K1' may be used to decrypt the first encrypted data segment 254, and a second token public cryptographic key K2' may be used to decrypt the second encrypted data segment 256.

The authorized user database 414 may include groups of related database records. In one example, each records group is uniquely associated with a respective registered user of the message processing network 100. Each records group typically identifies a unique user identifier userID for the registered user, and an account number of a financial account associated with the registered user. The user identifier userID stored in the authorized user database 414 may be the same as, or different from, the user identifier that the user uses to authenticate to the user's financial institution server 300.

The non-transient computer-readable medium 410 also stores computer processing instructions which, when executed by the microprocessor(s) 408, define an operating system 416 that controls the overall operation of the message processing server 400. The computer processing instructions may also implement a message processor 418.

The message processor 418 is configured to (i) receive a first authorization message that includes a first cryptographic key K1 and a second data value; (ii) derive a first decrypted data layer from one of the multi-layer tokens 250 by decrypting the first encrypted data layer (first encrypted data segment 254) with the first cryptographic key K1; and (iii) validate the first data pointer of the first decrypted data layer by receiving confirmation of the first data pointer pointing to a database entry comprising the second data value 260;

The message processor 418 is also configured to (iv) receive a second authorization message that includes one of the second cryptographic keys K2 and a third data value; (v) derive a second decrypted data layer from the multi-layer token 250 by decrypting the second encrypted data layer (second encrypted data segment 256) of the first decrypted data layer with the second cryptographic key K2; and (vi) validate the second data pointer of the second decrypted data layer by receiving confirmation of the second data pointer pointing to a database entry comprising a maximum data value 262 not less than the third data value.

The message processor 418 may also be configured to, prior to receiving the first authorization message, (a) receive from one of the communications device 200 an authentication request identifying a first data value (e.g. a proposed transaction amount); (b) validate the authentication request from the first data value and the reference data value (e.g. pre-authorized payment amount) 262 configured in the primary encrypted data segment 252 of the multi-layer token 250; and (c) provide the communications device 200 with the first cryptographic key K1 associated with the multi-layer token 250.

The authentication request may include the master cryptographic key K0, and the message processor 418 may be configured to (d) derive a primary decrypted data layer from the multi-layer token 250 by decrypting the primary encrypted data layer (primary encrypted data segment 252) with the master cryptographic key K0; and (e) validate the first data value against the reference data value 262 of the primary decrypted data layer.

In one example, the message processor 418 is configured to decrypt the primary encrypted data layer (primary encrypted data segment 252) without exposing the reference data value 262 outside the message processor 418.

Although the message processor 418 is typically implemented as computer processing instructions, all or a portion of the message processor 418 may be implemented instead in electronics hardware, such as a field programmable logic gate array (FPGA) or a complex programmable logic device (CPLD).

Method of Securing and Recovering Data

As discussed, the message processing network 100 implements a method of securing and recovering data using a message processor 418 and a token database 412 of multi-layer tokens 250. A sample embodiment of the method will be discussed below, with reference to FIGS. 5a, 5b, 5c.

By way of overview, each multi-layer token 250 includes a plurality of encrypted data segments/layers. The first encrypted data segment/layer 254 includes the second encrypted data layer and a first data pointer. The second encrypted data segment/layer 256 includes a second data pointer.

As will be explained, in this embodiment, the message processor 418 receives a first authorization message that includes a first cryptographic key and a second data value, and derives a first decrypted data segment/layer from one of the multi-layer tokens 250 by decrypting the first encrypted data segment/layer 254 thereof with the first cryptographic key. The message processor 418 then validates the first data pointer of the first decrypted data layer by receiving confirmation of the first data pointer pointing to a database entry comprising the second data value.

The message processor 418 also receives a second authorization message that includes a second cryptographic key and a third data value, derives a second decrypted data layer from the multi-layer token 250 by decrypting the second encrypted data segment/layer 256 thereof with the second cryptographic key. The message processor 418 then validates the second data pointer of the second decrypted data layer by receiving confirmation of the second data pointer pointing to a database entry comprising a maximum data value not less than the third data value.

Prior to receiving the first authorization message, the message processor 418 may also receive from one of the communications devices 200 an authentication request that identifies a first data value (e.g. a proposed transaction amount), validate the authentication request from the first data value and the reference data value (e.g. pre-authorized payment amount) 262 configured in the primary encrypted data segment 252 of the multi-layer token 250, and provide the communications device 200 with the first cryptographic key K1 associated with the multi-layer token 250 (or a pointer to the multi-layer token 250).

The authentication request may include the master cryptographic key K0, and the message processor 418 may derive a primary decrypted data layer from the multi-layer token 250 by decrypting the primary encrypted data layer (primary encrypted data segment 252) with the master cryptographic key K0. The message processor 418 may then validate the first data value against the reference data value 262 of the primary decrypted data layer.

In one example, the message processor 418 decrypts the primary encrypted data layer (primary encrypted data segment 252) without exposing the reference data value 262 outside the message processor 418.

The authentication request may include the multi-layer token 250. The first authorization message may include the first encrypted data segment 254 (i.e. the multi-layer token 250 with the primary encrypted data segment 252 decrypted, but with the reference data value 262 removed/deleted). The second authorization message may include the second encrypted data segment 256 (i.e. the multi-layer token 250 with the primary encrypted data segment 252 and the first encrypted data segment 254 decrypted, but with the reference data value 262 and the first data pointer to the database storing the second data value 260 removed/deleted). Alternately, the authentication request, the first authorization message and/or the second authorization message may include a pointer to the multi-layer token 250 in the token database 412.

Figure 5A:
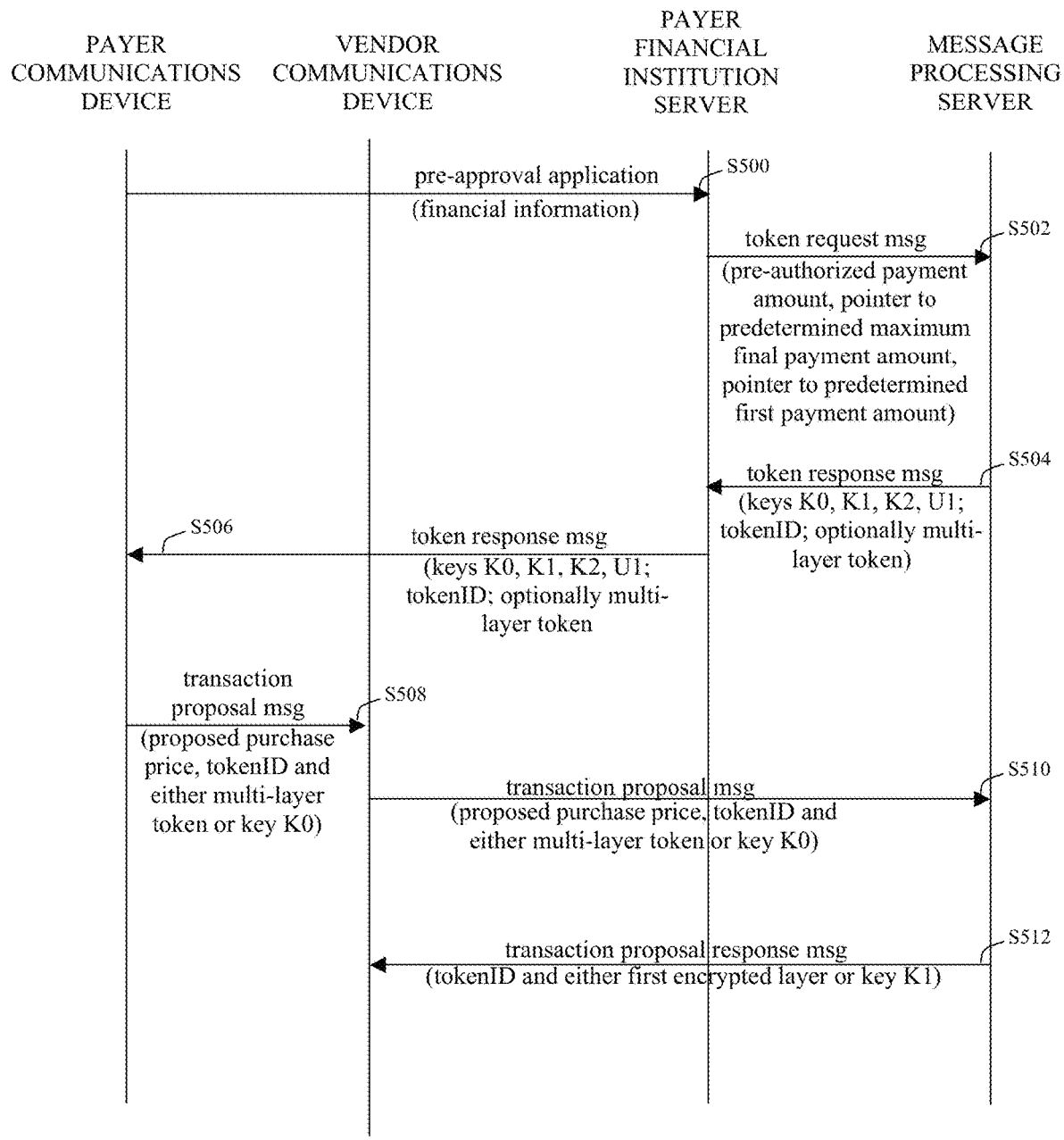
FIGS. 5a, 5b, 5c together comprise a message flow diagram depicting an exemplary method of securing and recovering data using one of the multi-layer tokens.
Figure 5B:
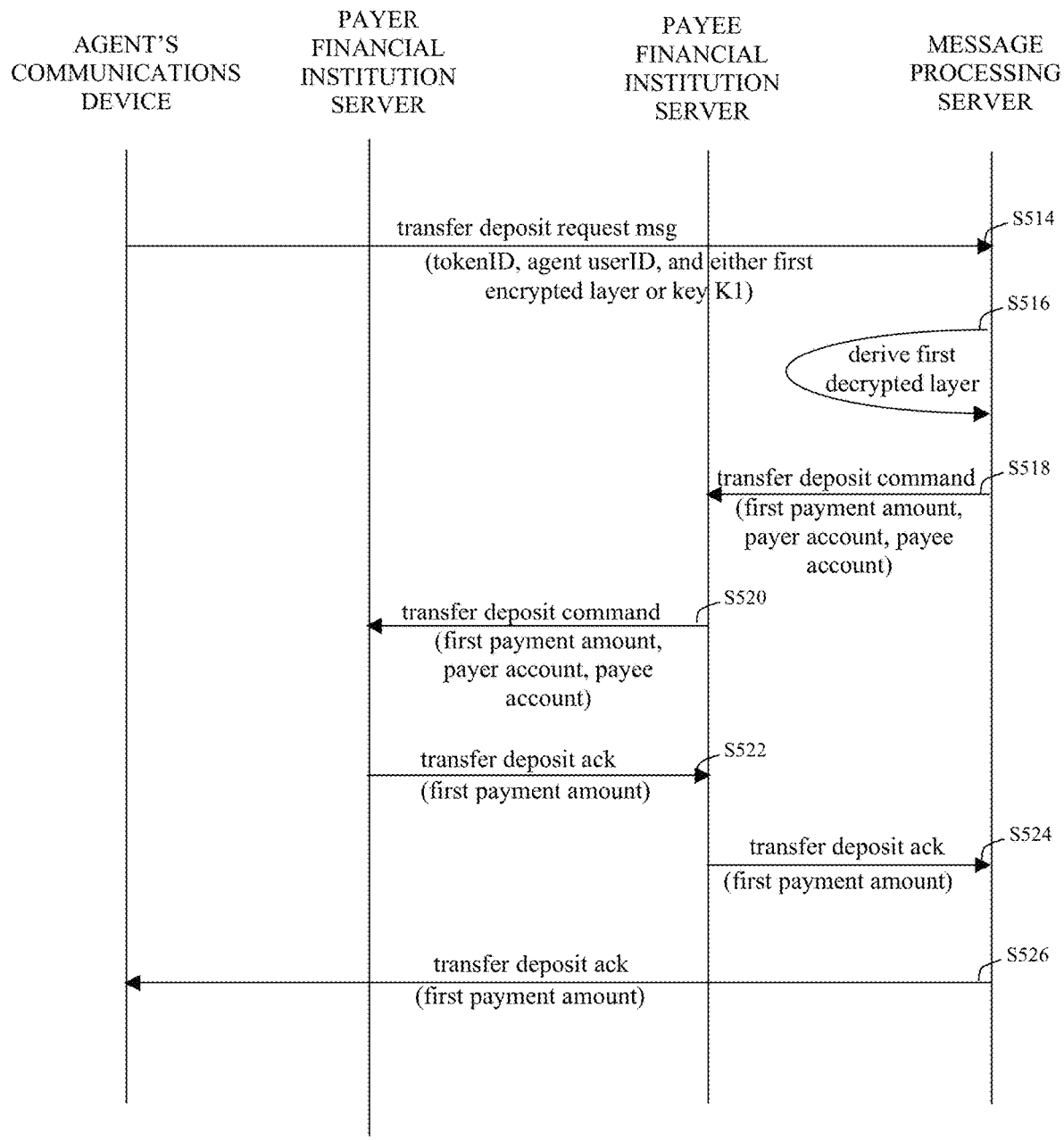
Figure 5C:
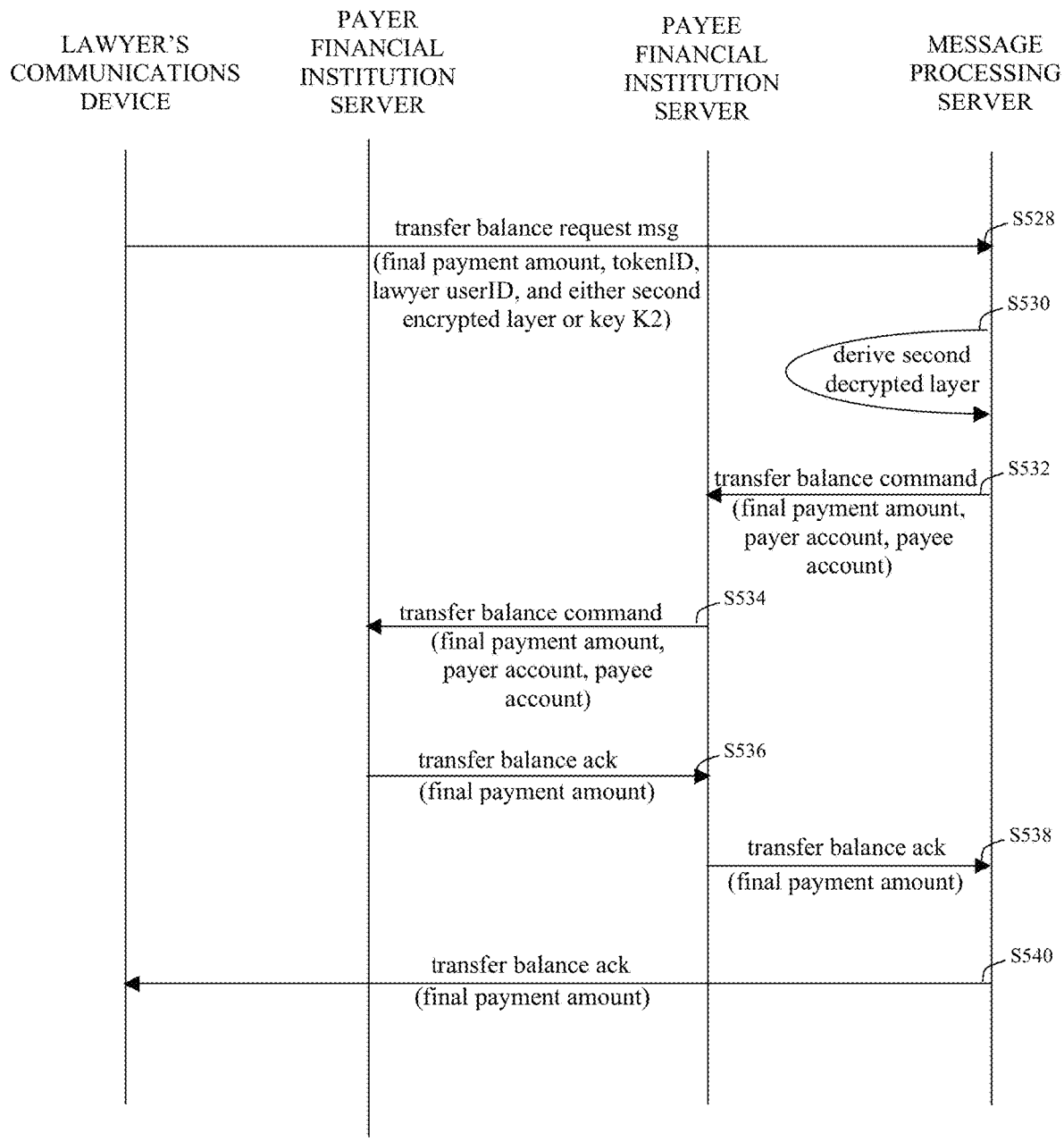

An example method of securing and recovering data will now be discussed in detail with reference to FIGS. 5a, 5b, 5c. The following method includes two phases: (1) a token generation phase, and (2) a token redemption phase. Both phases are discussed below under their respective headings.

(1) Token Generation Phase

At the outset of the method, a registered user ("payer user") of the message processing network 100 may connect to the payer financial institution server 300a of the payer's financial institution via the payer's communications device 200a, and may use the payer's communications device 200 to authenticate to the payer financial institution server 300a by providing the payer financial institution server 300a with a user identifier and authentication code.

After the registered user has authenticated to the payer financial institution server 300a, the payer user may use the payer communications device 200a to invoke a process running on the payer financial institution server 300a, initiating an application for pre-approval of a financial loan for a prospective high-value financial transaction (e.g. purchase of an specified home or business).

In response to the pre-approval application, the payer financial institution server 300a may request financial information from the payer user (e.g. payer's annual income and expenses, and the payer's assets, liabilities, and employment history). The payer user may provide the payer financial institution server 300a with the requested financial information, at step S500. The payer user may also provide the payer financial institution server 300a with the user identifier userID that is uniquely associated with the payer user.

After considering the payer's financial information, and optionally various other financial indicators, such as current interest rates and the payer's credit history, the payer financial institution generates a predetermined maximum final payment amount 258 for the prospective high-value financial transaction. As will be explained, when the prospective high-value financial transaction closes, the message processing server 400 will command the payer financial institution to transfer to a payee financial institution an amount (the second payment amount) not exceeding the predetermined maximum final payment amount 258.

The payer may pledge liquid assets for the prospective high-value financial transaction. The value of these assets may comprise the predetermined first payment amount 260. As will be explained, after the terms (e.g. proposed purchase price, predetermined first payment amount 260, second payment amount, closing date, closing conditions) specified by the payer user for the prospective high-value financial transaction are accepted, the message processing server 400 will command the payer financial institution to transfer the predetermined first payment amount 260 to the payee financial institution.

The payer financial institution also determines a pre-authorized payment amount 262 for the prospective high-value financial transaction. The pre-authorized payment amount 262 is typically equal to the sum of the predetermined maximum final payment amount 258 and the predetermined first payment amount 260. Therefore, the pre-authorized payment amount 262 is the maximum amount that the payer financial institution determines that the payer user can afford to spend for the prospective high-value financial transaction.

As a non-limiting example, the prospective high-value financial transaction may be a proposed home purchase, the payer user may have cash in the amount of $100,000, with $10,000 thereof to be used as a deposit to bind a written purchase agreement, and the balance ($90,000) to be used as a down-payment for the home purchase. The payer user may also have been pre-approved for a mortgage in the amount of $400,000. Therefore, in this example, the predetermined first payment amount 260 specified in the first encrypted data segment/layer 254 of the multi-layer token 250 would be $10,000, and would be transferred to the payee as a deposit upon the payee accepting the terms specified by the payer in the written purchase agreement.

In this example, the predetermined maximum final payment amount 258 specified in the second encrypted data segment/layer 256 of the multi-layer token 250 would be $490,000, based on the down-payment amount ($90,000) and the pre-approved mortgage amount ($400,000). A second payment amount, up to the predetermined maximum final payment amount 258 ($490,000), would be transferred to the payee when the payee has satisfied the closing conditions. The second payment amount will vary based on the purchase price negotiated for the home purchase, but will not exceed the predetermined maximum final payment amount 258 ($490,000).

The pre-authorized payment amount 262, in this example, would be $500,000, which is the maximum amount that the payer user can spend on the home purchase. As will be explained, although the pre-authorized payment amount 262 is not disclosed to the payee user, the message processing server 400 will advise the payee user whether the payer's proposed purchase price ("offer") exceeds the pre-authorized payment amount 262.

After determining the predetermined maximum final payment amount 258 and the predetermined first payment amount 260 for the prospective high-value financial transaction, the payer financial institution may deposit the predetermined maximum final payment amount 258 and the predetermined first payment amount 260 into one or more financial accounts maintained by the payer financial institution. Alternately, since the predetermined maximum final payment amount 258 need not be paid until the financial transaction closes, the payer financial institution may defer depositing the predetermined maximum final payment amount 258 into an account until immediately prior to the transaction closing date.

The payer financial institution server 300a generates pointers to the account(s) for the predetermined maximum final payment amount 258 and the predetermined first payment amount 260. The pointers each identify the payer financial institution and the financial account(s) for the respective payment amounts 258, 260, and include any authorization codes that may be required for the message processing server 400 to initiate the transfer of the respective payment amounts 258, 260 to the payee financial institution.

At step S502, the payer financial institution server 300a generates a token request message that includes the pre-authorized payment amount 262, the pointer to the database storing the predetermined maximum final payment amount 258, and the pointer to the database storing the predetermined first payment amount 260 (and the user identifier userID, if provided), and transmits the token request message to the message processing server 400.

In response, the message processing server 400 generates a multi-layer token 250 from at least the cryptographic keys K1, K2, the pre-authorized payment amount 262, the pointer to the database storing the predetermined maximum final payment amount 258, and the pointer to the database storing the predetermined first payment amount 260.

As discussed, the multi-layer token 250 includes a hierarchical arrangement of encrypted data segments/layers. In one example, the multi-layer token 250 includes a first encrypted data segment/layer 254, a second encrypted data segment/layer 256, and optionally also a primary encrypted data segment/layer 252. Further, the cryptographic keys K0, K1, K2 may each be uniquely associated with a respective one of the data segments/layers 252, 254, 256.

The second encrypted data segment/layer 256 includes the pointer to the database storing the predetermined maximum final payment amount 258. The message processing server 400 may generate the second encrypted data segment/layer 256 by applying the second cryptographic key K2 and the pointer to the database storing the predetermined maximum final payment amount 258 as inputs to a cryptographic algorithm.

The first encrypted data segment/layer 254 includes the second encrypted data segment/layer 256 and the pointer to the database storing the predetermined first payment amount 260. The message processing server 400 may generate the first encrypted data segment/layer 254 by applying the first cryptographic key K1, the second encrypted data segment/ layer 256 and the pointer to the database storing the predetermined first payment amount 260 as inputs to a cryptographic algorithm.

The primary encrypted data segment/layer 252 includes the first encrypted data segment/layer 254 and the pre-authorized payment amount 262. Further, as will be explained, it may be advantageous to uniquely associate each multi-layer token 250 with the respective payer user. Therefore, the primary encrypted data segment/layer 252 may also include a token identifier tokenID that is uniquely associated with the payer user. The message processing server 400 may generate the primary encrypted data segment/layer 252 by applying the master cryptographic key K0, the first encrypted data segment/layer 254 and the pre-authorized payment amount 262 (and optionally the token identifier tokenID) as inputs to a cryptographic algorithm.

After generating the first encrypted data segment/layer 254, and the second encrypted data segment/layer 256 (and optionally the primary encrypted data segment/layer 252), the message processing server 400 may save the resulting multi-layer token 250 in the token database 412, in association with the cryptographic keys K1, K2, K0 (and the token identifier tokenID) that were used to generate the encrypted data segment/layers 254, 256, 252.

Further, it may be advantageous to limit the likelihood of a token recipient making unauthorized use of a payer's multi-layer token 250. Therefore, the message processing server 400 may also save in the token database 412, in association with the multi-layer token 250, a user cryptographic key U1 that is associated with the payer user. The user cryptographic key U1 may be a symmetric cryptographic key, or a public cryptographic key of an asymmetric cryptographic key pair. As will be discussed below, a payer user may use the payer's user cryptographic key U1 (or a private cryptographic key associated with the payer's user (public) cryptographic key U1) to cryptographically-sign a transaction proposal message (that includes a proposed transaction amount and a multi-layer token 250), and the message processing server 400 may be configured to validate the cryptographically-signed transaction proposal message with the user cryptographic key U1.

The message processing server 400 may generate the cryptographic keys K0, K1, K2 (and optionally the token identifier tokenID and the user cryptographic key U1) by employing any suitable cryptographic technique known in the art, including generating each key/tokenID from a pseudo-random number generator or a noise generator. The message processing server 400 may confirm that each new cryptographic key K0, K1, K2 is uniquely associated with the respective data segment 252, 254, 256 (and that each token identifier tokenID and user cryptographic key U1 is uniquely associated with the payer user) by querying the token database 412 with the key/tokenID, and saving the key/tokenID in the token database 412 only after confirming that the key/tokenID has not already been saved to the token database 412.

The message processing server 400 may generate the cryptographic keys K0, K1, K2 (and the token identifier tokenID and the user cryptographic key U1) in response to the token request message received from the payer financial institution server 300a (step S502). Alternately, the cryptographic keys K0, K1, K2 (and the token identifier tokenID and the user cryptographic key U1) may be generated and stored in the token database 412 prior to receipt of the token request message (step S502).

The message processing server 400 may generate a token response message that includes the cryptographic keys K0, K1, K2, the token identifier tokenID, and optionally also includes the multi-layer token 250 (and the user cryptographic key U1, if generated).

At step S504, the message processing server 400 transmits the token response message to the payer financial institution server 300a. In response, the payer financial institution server 300a transmits the token response message to the payer's communications device 200, at step S506. The data processing system 206 may then save the contents of the token response message in the memory 212 of the payer's communications device 200a.

The financial information of the payer user (e.g. payer's annual income and expenses, and the payer's assets, liabilities, and employment history) may change after the payer's communications device 200 receives the token response message for the prospective high-value financial transaction. Alternately, the predetermined maximum final payment amount 258 determined by the payer's financial institution at step S502 might have been contingent on the sufficiency of the actual market value of the prospective high-value financial transaction. For example, the maximum monetary amount that the payer's financial institution might be prepared to pay upon closing of the high-value financial transaction might be limited by the business rules of the payer's financial institution to a maximum percentage of the current market value of the transaction. Accordingly, if the payer user decided on a specific high-value financial transaction (e.g. purchase a specific home or business) after the payer's communications device 200 received the token response message, the payer user may wish to ensure that the current market value of the transaction is consistent with the business rules of the payer's financial institution to guarantee payment of the predetermined final payment amount 258. In either situation, the payer user may use the payer's communications device 200a to invoke a process running on the payer financial institution server 300a, initiating a pre-approval application update to the financial transaction pre-approval.

In response to the pre-approval application update, the payer financial institution server 300a may request the updated financial information from the payer user, and the payer user may provide the payer financial institution server 300a with the token identifier tokenID and the requested updated financial information (e.g. change to payer's annual income, expenses, assets, liabilities and/or employment history, or particulars of the high-value financial transaction). The payer financial institution server 300a may update the pre-authorized payment amount 262, the predetermined first payment amount 260, and/or the predetermined maximum final payment amount 258 based on the updated financial information, and may generate a token update request message that includes the token identifier tokenID, the updated pre-authorized payment amount 262, the pointer to the database storing the updated predetermined maximum final payment amount 258, and the pointer to the database storing the updated predetermined first payment amount 260.

Where the updated financial information includes particulars (e.g. address of a home or business) of the prospective high-value financial transaction, the payer financial institution server 300a may query a valuation database with the transaction particulars to determine the approximate current market value of the high-value financial transaction. Based on the determined approximate current market value of the high-value financial transaction, the payer financial institution server 300a may then adjust the predetermined maximum final payment amount 258 (and, therefore, the pre-authorized payment amount 262), if required, to be consistent with the business rules of the payer's financial institution.

The payer financial institution server 300a transmits the token update request message to the message processing server 400, and the message processing server 400 generates an updated multi-layer token 250 and saves the updated multi-layer token 250 in the token database 412 in association with the token identifier tokenID, as described above. The message processing server 400 may generate a token update response message that includes the token identifier tokenID and optionally may also include the updated multi-layer token 250, and may transmit the token update response message to the payer financial institution server 300a. In response, the payer financial institution server 300a transmits the token update response message to the payer's communications device 200a.

(2) Token Redemption Phase

After the payer's communications device 200 receives the token (update) response message for the prospective high-value financial transaction, the payer may propose a high-value financial transaction to a registered user ("vendor user") of the message processing network 100 by providing the vendor user with a written offer specifying the terms (e.g. proposed purchase price, predetermined first payment amount 260, second payment amount, closing date, closing conditions) of the financial transaction.

Continuing from the foregoing example where the predetermined first payment amount 260 is $10,000, and the predetermined maximum final payment amount 258 is $490,000, the second payment amount would be $480,000 if the payer's proposed purchase price was $490,000. Since the second payment amount cannot exceed the predetermined maximum final payment amount 258 ($490,000), the payer's proposed purchase price cannot exceed the pre-authorized payment amount 262 ($500,000).

If the vendor user accepts the terms of the proposed high-value financial transaction, the payer user may use the token handling processor 216 on the payer's communications device 200a to derive a primary decrypted data segment/layer by decrypting the primary encrypted data segment/layer 252 of the multi-layer token 250 using the master cryptographic key K0, extract the first encrypted data segment/layer 254 from the primary decrypted data segment/layer, and generate a transaction proposal response message that includes the token identifier tokenID and either the first cryptographic key K1 or the first encrypted data segment/layer 254.

The token handling processor 216 may transmit the transaction proposal response message to the vendor's communications device 200b, at step S512. As non-limiting examples, the token handling processor 216 of the payor's communications device 200a may wirelessly transmit the transaction proposal response message to the vendor's communications device 200b directly (for example via Bluetooth or NFC) or indirectly (for example via WiFi or cellular communications) by e-mail or a relay and proximity service, for example the relay service provided by Bump Technologies.

Alternately, before considering the terms of the proposed high-value financial transaction, the vendor user might prefer that the payer user first demonstrate that the payer has sufficient financial resources to complete the financial transaction. However, the payer user might not want to reveal to the vendor user particulars of the payer's financial resources, such as the payer's pre-authorized payment amount 262.

To address this potential impasse, the payer user may initiate the token handling processor 216 on the payer's communications device 200a, and use the input device 204 thereof to input the proposed purchase price to the token handling processor 216. In response, the token handling processor 216 may generate a transaction proposal message that identifies the proposed purchase price and includes the token identifier tokenID and either the multi-layer token 250 or the master cryptographic key K0. The payer user may use the input device 204 to input the payer's user identifier userID, and the token handling processor 216 may incorporate the user identifier userID into the transaction proposal message. The token handling processor 216 may cryptographically sign the transaction proposal message with the user cryptographic key U1.

At step S508, the payor's communications device 200a transmits the transaction proposal message to the vendor's communications device 200b. As non-limiting examples, the token handling processor 216 of the payor's communications device 200a may wirelessly transmit the transaction proposal message to the vendor's communications device 200b directly (for example via Bluetooth or NFC) or indirectly (for example via WiFi or cellular communications) by e-mail or a relay and proximity service, for example the relay service provided by Bump Technologies.

The vendor's communications device 200b may extract the proposed purchase price from the transaction proposal message and display the extracted proposed purchase price on the display 202 thereof. After confirming that the displayed proposed purchase price matches the proposed purchase price specified in the payer's written offer, at step S510 the vendor user may use the vendor's communications device 200b to transmit the transaction proposal message to the message processing server 400 for confirmation that the payer has sufficient financial resources to complete the financial transaction.

As discussed, the predetermined maximum final payment amount 258 determined by the payer's financial institution at step S502 might have been contingent on the sufficiency of the actual market value of the prospective high-value financial transaction. Accordingly, the vendor user may use the input device 204 of the vendor's communications device 200b to input particulars of the prospective high-value financial transaction to the token handling processor 216 of the vendor's communications device 200b. For example, where the prospective high-value financial transaction relates to the purchase of a home or business, the vendor may input the address of the home or business. The token handling processor 216 may generate an enhanced transaction proposal message that includes the transaction particulars (e.g. address information) and the payer's transaction proposal message, and transmit the enhanced transaction proposal message to the message processing server 400 at step S510.

If the payer's transaction proposal message includes a token identifier tokenID and was cryptographically signed, the message processor 418 of the message processing server 400 may validate the payer's transaction proposal message using the user cryptographic key U1 associated with the originator of the transaction proposal message. The message processor 418 may query the token database 412 with the token identifier tokenID to locate the user cryptographic key U1 associated with the token identifier tokenID, and use the located user cryptographic key U1 to validate the digital signature of the payer's transaction proposal message.

If the message processor 418 successfully validates the cryptographically-signed transaction proposal message, the message processor 418 has thereby confirmed that the payer user created the transaction proposal message (i.e. the vendor user did not alter the proposed purchase price, for example, prior to sending the transaction proposal message to the message processing server 400).

If the transaction proposal message includes a token identifier tokenID, the message processor 418 may further validate the payer's transaction proposal message by confirming that the multi-layer token 250 is uniquely associated with the payer user. If the payer's transaction proposal message includes the multi-layer token 250, the message processor 418 may locate the master cryptographic key K0 that is associated with the token identifier tokenID in the token database 412, derives a primary decrypted data segment/layer by decrypting the primary encrypted data segment/layer 252 of the multi-layer token 250 using the located master cryptographic key K0, and validate the transaction proposal message by comparing the token identifier tokenID included in the primary decrypted data segment/layer with the token identifier tokenID included in the payer's transaction proposal message.

Alternately, if the payer's transaction proposal message includes the master cryptographic key K0, the message processor 418 may locate the multi-layer token 250 in the token database 412 using the token identifier tokenID included in the payer's transaction proposal message, derive a primary decrypted data segment/layer by decrypting the primary encrypted data segment/layer 252 of the located multi-layer token 250 using the master cryptographic key K0, read the token identifier tokenID from the primary decrypted data segment/layer, and validate the payer's transaction proposal message by comparing the token identifier tokenID included in the primary decrypted data segment/layer with the token identifier tokenID included in the payer's transaction proposal message.

If the message processor 418 successfully confirms that the multi-layer token 250 is uniquely associated with the payer user, the message processor 418 has thereby confirmed that the payer user did not attempt to close the proposed financial transaction by providing the vendor user with the multi-layer token 250 of another registered user of the message processing network 100.

After the message processor 418 successfully validates the payer's transaction proposal message (if the transaction proposal message was cryptographically-signed and/or included a token identifier tokenID), the message processor 418 validates the transaction proposal from the proposed transaction amount and the pre-authorized payment amount 262 configured in the multi-layer token 250.

The message processor 418 may validate the transaction proposal by reading the pre-authorized payment amount 262 from the primary decrypted data segment/layer, and comparing the pre-authorized payment amount 262 (e.g. $500,000) against the proposed transaction amount (e.g. $490,000) specified in the transaction proposal message.

Alternately (or additionally), the message processing server 400 may request from the payer financial institution server 300a a real-time update to the pre-authorized payment amount 262 configured in the multi-layer token 250, and validate the transaction proposal by comparing the updated pre-authorized payment amount 262 against the proposed transaction amount specified in the transaction proposal message. Therefore, the message processor 418 may query the authorized user database 414 with the payer's user identifier userID (if provided) to locate the financial account information that is associated with the payer user in the authorized user database 414, and then generate a pre-approval application update request that includes the located financial account information and the token identifier tokenID. If the payer's user identifier userID is the same user identifier that the payer user uses to authenticate to the payer financial institution server 300a, the message processor 418 may instead include the user identifier userID and the token identifier tokenID in the pre-approval application update request. The message processor 418 may then transmit the pre-approval application update request to the payer financial institution server 300a to determine whether the payer user's financial position has changed since the date that the multi-layer token 250 was generated.

The payer financial institution server 300a may use the financial account information or the user identifier userID, included in the pre-approval application update request, to identify the payer user. After re-considering the payer's financial information, and optionally various other financial indicators, such as current interest rates and the payer's current credit history, the payer financial institution may update the predetermined maximum final payment amount 258 and the pre-authorized payment amount 262, and generate a token update request message that includes the token identifier tokenID, the updated pre-authorized payment amount 262, the pointer to the database storing the updated predetermined maximum final payment amount 258, and the pointer to the database storing the predetermined first payment amount 260.

The payer financial institution server 300a may transmit the token update request message to the message processing server 400, and the message processing server 400 may generate an updated multi-layer token 250 and save the updated multi-layer token 250 in the token database 412 in association with the token identifier tokenID, as described above. The message processor 418 may validate the transaction proposal by comparing the pre-authorized payment amount 262 configured in the updated multi-layer token 250 against the proposed transaction amount specified in the transaction proposal message.

If the message processor 418 determines that the pre-authorized payment amount 262 (e.g. $500,000) is at least equal to the proposed transaction amount (e.g. $490,000), the message processor 418 has validated the transaction proposal and has thereby confirmed that the payer has sufficient financial resources to complete the financial transaction. The message processor 418 may save the first encrypted data segment/layer 254 in the token database 412 in association with the tokenID.

Alternately, as discussed, the predetermined maximum final payment amount 258 determined by the payer's financial institution at step S502 might have been contingent on the sufficiency of the actual market value of the prospective high-value financial transaction. Therefore, where the enhanced transaction proposal message includes particulars of the prospective high-value financial transaction, the message processor 418 may query a valuation database with the transaction particulars to determine the approximate current market value of the high-value financial transaction. For example, where the prospective high-value financial transaction relates to the purchase of a home or business, the message processor 418 may query a residential property valuation (e.g. Municipal Property Assessment Corporation (MPAC)) database with the address information to determine the approximate current market value of the home/business.

Based on the determined approximate current market value of the high-value financial transaction, the message processor 418 may then confirm that the predetermined maximum final payment amount 258 is consistent with the business rules of the payer's financial institution. For example, the maximum monetary amount that the payer's financial institution might be prepared to pay upon closing of the high-value financial transaction might be limited by the business rules of the payer's financial institution to a maximum percentage of the current market value of the transaction. Therefore, the message processor 418 may determine the maximum allowable payment amount that is payable upon closing from the maximum percentage and the determined current market value of the transaction, and confirm that the predetermined maximum final payment amount 258 does not exceed the maximum allowable payment amount. The message processor 418 may then save the first encrypted data segment/layer 254 in the token database 412 in association with the tokenID.

Continuing with the foregoing example, where the predetermined maximum final payment amount 258 was $490,000, based on the down-payment amount ($90,000) and the pre-approved mortgage amount ($400,000), the business rules might limit the maximum allowable payment amount upon closing to, for example, 90% of the current market value of the financial transaction. If the current market value of the financial transaction is, for example, $475,000, the message processor 418 may validate the transaction proposal by determining the maximum allowable payment amount (90%×$475,000=$427,500), and confirming that the pre-approved mortgage amount (e.g. $400,000) does not exceed the maximum allowable payment amount.

The message processor 418 may then generate a transaction proposal response message that includes the token identifier tokenID and either the first encrypted data segment/layer 254 or the first cryptographic key K1.

The message processing server 400 transmits the transaction proposal response message to the vendor's communications device 200b, at step S512. The vendor may then deliver the transaction proposal response message (for example, using the vendor's communications device 200b) to an authorized agent of the vendor.

After the authorized agent receives the transaction proposal response message, the authorized agent may initiate the token handling processor 216 on the agent's communications device 200c to thereby effect a transfer of the predetermined first payment amount 260 to the payee financial institution. As discussed, the first encrypted data segment 254 includes a pointer to a database storing the predetermined first payment amount 260.

In response, the token handling processor 216 may generate a transfer deposit request message that includes the token identifier tokenID and either the first encrypted data segment/layer 254 or the first cryptographic key K1. The agent may use the input device 204 to input the agent's userID to the token handling processor 216 and, therefore, the transfer deposit request message may also include the authorized agent's userID.

At step S514, the authorized agent's communications device 200c transmits the transfer deposit request message to the message processing server 400 to initiate the transfer of the predetermined first payment amount 260 (e.g. $10,000) from the payer financial institution to the payee financial institution. As will be apparent, the message processing server 400 receives the transfer deposit request message over a communications channel that is distinct from the communications channel over which the message processing server 400 provides the first cryptographic key K1 to the payer communications device 200a (steps S504, S506).

If the transfer deposit request message includes an agent's userID, the message processor 418 may validate the transfer deposit request message by verifying that the authorized user database 414 includes a records group associated with the agent's userID. If the message processor 418 successfully confirms that the authorized user database 414 includes a records group associated with the agent's userID, the message processor 418 has thereby confirmed that the transfer deposit request message was generated by a registered user of the message processing network 100.

After the message processor 418 successfully validates the transfer deposit request message (if the transfer deposit request message includes an authorized agent's userID), the message processor 418 derives a first decrypted data layer by decrypting the first encrypted data segment/layer 254 with the first cryptographic key K1.

If the transfer deposit request message includes the first encrypted data segment/layer 254, the message processor 418 may locate the first cryptographic key K1 that is associated with the token identifier tokenID in the token database 412, and decrypt the first encrypted data segment/layer 254 using the located first cryptographic key K1. Alternately, if the transfer deposit request message includes the first cryptographic key K1, the message processor 418 may locate the first encrypted data segment/layer 254 that is associated with the token identifier tokenID in the token database 412, and decrypt the located first encrypted data segment/layer 254 using the first cryptographic key K1.

After the message processor 418 derives the first decrypted data layer from the first encrypted data segment/layer 254, at step S516 the message processor 418 may extract the second encrypted data segment/layer 256 from the first decrypted data layer, and save the second encrypted data segment/layer 256 in the token database 412 in association with the tokenID.

The message processor 418 then uses the pointer to the financial account of the predetermined first payment amount 260 at the payer financial institution to effect a transfer of the predetermined first payment amount 260 from the payer financial institution to the payee financial institution. The message processor 418 extracts from the first decrypted data segment the pointer to the financial account at the payer financial institution that holds the predetermined first payment amount 260.

From the financial account information of the records group associated with the authorized agent's userID in the authorized user database 414, the message processor 418 determines the financial account at the payee financial institution into which the predetermined first payment amount 260 should be deposited, and saves the financial account information in the token database 412 in association with the tokenID. The message processor 418 then generates a transfer deposit command that includes the predetermined first payment amount 260, the financial account information at the payee financial institution, and the pointer to the financial account of the predetermined first payment amount 260 at the payer financial institution.

At step S518, the message processing server 400 may transmit the transfer deposit command to the payee financial institution server 300b. In response, the payee financial institution server 300b may determine the payer's financial institution from the pointer included in the transfer deposit command, and redirect the transfer deposit command to the payer financial institution server 300a, at step S520.

Upon receipt of the transfer deposit command, the payer financial institution server 300a may determine the payer financial account and the predetermined first payment amount 260 from the pointer included in the transfer deposit command. The payer financial institution server 300a may determine the payee financial account from the financial account information included in the transfer deposit command. The payer financial institution server 300a may then initiate a funds transfer of the predetermined first payment amount 260 (e.g. $10,000) from the determined payer financial account to the determined payee financial account.

At step S522, the payer financial institution server 300a may respond to the transfer deposit command by transmitting to the payee financial institution server 300b a transfer deposit acknowledgment message that confirms the transfer of the predetermined first payment amount 260 to the payee financial account. The payee financial institution server 300b may provide the message processing server 400 with the transfer deposit acknowledgment message, in response to the transfer deposit command, at step S524.

Alternately, at step S518 the message processing server 400 may determine the payer's financial institution from the pointer included in the transfer deposit command, and transmit the transfer deposit command to the payer financial institution server 300a. The payer financial institution server 300a may initiate a funds transfer of the predetermined first payment amount 260 from the payer financial account to the payee financial account, as described above, and transmit the transfer deposit acknowledgment message to the message processing server 400, at step S524.

The message processing server 400 may transmit the transfer deposit acknowledgment message to the authorized agent's communications device 200c, in response to the transfer deposit request message, at step S526.

After the payer and vendor have satisfied the remaining terms (e.g. closing date, closing conditions) specified by the payer user for the prospective high-value financial transaction, the payer user may initiate the token handling processor 216 on the payer's communications device 200a to initiate a transfer of the second payment amount to the payee financial institution. As discussed, the second encrypted data segment/layer 256 includes a pointer to the predetermined maximum final payment amount 258 (e.g. $490,000), and the second payment amount (e.g. $480,000) does not exceed the predetermined maximum final payment amount 258.

In response, the token handling processor 216 may derive a primary decrypted data segment/layer by decrypting the primary encrypted data segment/layer 252 of the multi-layer token 250 using the master cryptographic key K0, extract the first encrypted data segment/layer 254 from the primary decrypted data segment/layer, derive a first decrypted data segment/layer by decrypting the first encrypted data segment/layer 254 with the first cryptographic key K1, and extract the second encrypted data segment/layer 256 from the first decrypted data segment/layer.

The token handling processor 216 may then generate a transfer request message that includes the token identifier tokenID and either the second encrypted data segment/layer 256 or the second cryptographic key K2. The transfer request message may also include the payer's user cryptographic key U1.

The payer user delivers the transfer request message (for example, using the payer's communications device 200a) to a lawyer retained by the payer. As non-limiting examples, the token handling processor 216 of the payor's communications device 200a may wirelessly transmit the transfer request message to the lawyer's communications device 200d directly (for example via Bluetooth or NFC) or indirectly (for example via WiFi or cellular communications) by e-mail or a relay and proximity service, for example the relay service provided by Bump Technologies.

After the lawyer receives the transfer request message, the lawyer may initiate the token handling processor 216 on the lawyer's communications device 200d, and use the input device 204 thereof to input the balancing owing on the financial transaction (second payment amount) to the token handling processor 216.

In response, the token handling processor 216 may generate a transfer balance request message that identifies the second payment amount (e.g. $480,000) and includes the token identifier tokenID and either the second encrypted data segment/layer 256 or the second cryptographic key K2. The lawyer may use the input device 204 to input the lawyer's userID to the token handling processor 216 and, therefore, the transfer balance request message may also include the lawyer's userID.

At step S528, the lawyer's communications device 200d transmits the transfer balance request message to the message processing server 400 to initiate the transfer of the second payment amount (e.g. $480,000) from the payer financial institution to the payee financial institution.

If the transfer balance request message includes a lawyer userID, the message processor 418 may validate the transfer balance request message by verifying that the authorized user database 414 includes a records group associated with the lawyer's userID. If the message processor 418 successfully confirms that the authorized user database 414 includes a records group associated with the lawyer's userID, the message processor 418 has thereby confirmed that the transfer balance request message was generated by a registered user of the message processing network 100.

After the message processor 418 successfully validates the transfer balance request message (if the transfer balance request message includes a lawyer's userID), at step S530 the message processor 418 derives a second decrypted data layer by decrypting the second encrypted data segment/layer 256 with the second cryptographic key K2.

If the transfer balance request message includes the second encrypted data segment/layer 256, the message processor 418 may locate the second cryptographic key K2 that is associated with the token identifier tokenID in the token database 412, and decrypt the second encrypted data segment/layer 256 using the located second cryptographic key K2. Alternately, if the transfer deposit request message includes the second cryptographic key K2, the message processor 418 may locate the second encrypted data segment/layer 256 that is associated with the token identifier tokenID in the token database 412, and decrypt the located second encrypted data segment/layer 256 using the second cryptographic key K2.

After the message processor 418 derives the second decrypted data layer from the second encrypted data segment/layer 256, the message processor 418 reads the second (final) payment amount from the transfer balance request message, and uses the pointer to the financial account of the predetermined maximum final payment amount 258 at the payer financial institution to effect a transfer of the second (final) payment amount (e.g. $480,000) from the payer financial institution to the payee financial institution. The message processor 418 extracts from the second decrypted data segment the pointer to the financial account at the payer financial institution that holds the predetermined maximum final payment amount 258.

From the financial account information associated with the tokenID in the token database 412, the message processor 418 determines the financial account at the payee financial institution into which the second (final) payment amount should be deposited. The message processor 418 then generates a transfer balance command that identifies second (final) payment amount (e.g. $480,000) and includes the token identifier tokenID and the authorized financial account information at the payee financial institution and the pointer to the financial account of the predetermined maximum final payment amount 258 at the payer financial institution.

At step S532, the message processing server 400 may transmit the transfer balance command to the payee financial institution server 300b. In response, the payee financial institution server 300b may determine the payer's financial institution from the pointer included in the transfer balance command, and redirects the transfer balance command to the payer financial institution server 300a, at step S534.

Upon receipt of the transfer balance command, the payer financial institution server 300a determines the second payment amount (e.g. $480,000) from the transfer balance command, and determines the payer financial account from the pointer included in the transfer balance command. The payer financial institution server 300a determines the payee financial account from the financial account information included in the transfer balance command. The payer financial institution server 300a then initiates a funds transfer of the second payment amount from the determined payer financial account to the determined payee financial account.

At step S536, the payer financial institution server 300a may respond to the transfer balance command by transmitting to the payee financial institution server 300b a transfer balance acknowledgment message that includes the token identifier tokenID and confirms the transfer of the second payment amount (e.g. $480,000) to the payee financial account. The payee financial institution server 300b may provide the message processing server 400 with the transfer balance acknowledgment message, in response to the transfer deposit command, at step S538.

Alternately, at step S532 the message processing server 400 may determine the payer's financial institution from the pointer included in the transfer balance command, and transmit the transfer balance command to the payer financial institution server 300a. The payer financial institution server 300a may initiate a funds transfer of the second payment amount from the payer financial account to the payee financial account, as described above, and transmit the transfer balance acknowledgment message to the message processing server 400, at step S538.

The message processing server 400 removes from the token database 214 the cryptographic keys K0, K1, K2, U1 and associated data stored in the token database 214 in association with the token identifier tokenID, and may transmit the transfer balance acknowledgment message to the lawyer's communications device 200d, in response to the transfer deposit request message, at step S540.

The invention claimed is:

1. A message processing server comprising:
a memory storing a token database of multi-layer tokens, each said multi-layer token including a plurality of encrypted data layers, a primary one of the encrypted data layers including a first encrypted data layer and a reference data value, the first of the encrypted data layers including a second of the encrypted data layers and a first data pointer, the second encrypted data layer including a second data pointer; and
a message processor coupled to the memory and configured to:
receive from a communications device an authentication request identifying a first data value;
without exposing the reference data value outside the message processor, decrypt the primary encrypted data layer of one of the multi-layer tokens with a master cryptographic key,
validate the authentication request from the first data value and the reference data value;
receive, via a first communications channel, a first authorization message including a first cryptographic key and a second data value;
derive a first decrypted data layer from the one multi-layer token by decrypting the first encrypted data layer with the first cryptographic key;
validate the first data pointer of the first decrypted data layer by receiving confirmation of the first data pointer pointing to a database entry comprising the second data value;
receive, via a second communications channel, a second authorization message including a second cryptographic key and a third data value, the second communications channel being distinct from the first communications channel;
derive a second decrypted data layer from the one multi-layer token by decrypting the second encrypted data layer of the first decrypted data layer with the second cryptographic key; and
validate the second data pointer of the second decrypted data layer by receiving confirmation of the second data pointer pointing to a database entry comprising a maximum data value not less than the third data value.

2. The message processing server according to claim 1, wherein the token database includes a plurality of the first cryptographic keys each associated with respective one of the multi-layer tokens, and the message processor is configured to, prior to receiving the first authorization message, provide the communications device with the first cryptographic key associated with the one multi-layer token.

3. The message processing server according to claim 2, further including a registered user database comprising a plurality of user cryptographic keys, wherein the authentication request is cryptographically signed, and the message processor is configured to validate the cryptographically-signed authentication request with the user cryptographic key associated with an originator of the authentication request.

4. The message processing server according to claim 2, wherein the message processor is configured to provide the communications device with the first cryptographic key via a communications channel distinct from the first communications channel.

5. The message processing server according to claim 1, further comprising an authorized user database of authorized users, and wherein the first authorization message includes a first user identifier, and the message processor is configured to validate the first user identifier against the authorized user database.

6. The message processing server according to claim 5, wherein the second authorization message includes a second user identifier, and the message processor is configured to validate the second user identifier against the authorized user database.

7. The message processing server according to claim 1, wherein the first data pointer identifies a payer financial institution, the first authorization message identifies a payee financial institution, and the message processor is configured to validate the first data pointer by transmitting to one of the payer financial institution and the payee financial institution a funds transfer authorization including the first data pointer and authorizing a funds transfer from the payer financial institution to the payee financial institution in an amount of the second data value, and receiving from the computer server a confirmation of the funds transfer in the amount of the second data value.

8. The message processing server according to claim 7, wherein the message processor is configured to validate the second data pointer by transmitting to the one financial institution a funds transfer authorization including the second data pointer and authorizing a funds transfer from the payer financial institution to the payee financial institution in an amount of the third data value, and receiving from the one financial institution a confirmation of the funds transfer in the amount of the third data value.

9. A method of recovering encrypted data, the method being executable on a computer including a message processor and a memory, the memory storing a token database of multi-layer tokens, each said multi-layer token including a plurality of encrypted data layers, a primary one of the encrypted data layers including a first encrypted data layer and a reference data value, the first of the encrypted data layers including a second of the encrypted data layers and a first data pointer, the second encrypted data layer including a second data pointer, the method comprising the message processor:
  receiving from a communications device an authentication request identifying a first data value;
  without exposing the reference data value outside the message processor, decrypting the primary encrypted data layer of one of the multi-layer tokens with a master cryptographic key;
  validating the authentication request from the first data value and the reference data value;
  receiving, via a first communications channel, a first authorization message including a first cryptographic key and a second data value;
  deriving a first decrypted data layer from the one multi-layer token by decrypting the first encrypted data layer with the first cryptographic key, and validating the first data pointer of the first decrypted data layer by receiving confirmation of the first data pointer pointing to a database entry comprising the second data value;
  receiving, via a second communications channel, a second authorization message including a second cryptographic key and a third data value, the second communications channel being distinct from the first communications channel; and
  deriving a second decrypted data layer from the one multi-layer token by decrypting the second encrypted data layer of the first decrypted data layer with the second cryptographic key, and validating the second data pointer of the second decrypted data layer by receiving confirmation of the second data pointer pointing to a database entry comprising a maximum data value not less than the third data value.

10. The method according to claim 9, wherein the token database includes a plurality of the first cryptographic keys each associated with respective one of the multi-layer tokens, and the method further comprises prior to the receiving the first authorization message:
  providing the communications device with the first cryptographic key associated with the one multi-layer token.

11. The method according to claim 10, wherein the authentication request is cryptographically signed with a user cryptographic key associated with an originator of the authentication request, and the receiving an authentication request comprises validating the cryptographically-signed authentication request with the user cryptographic key associated with the authentication request originator.

12. The method according to claim 10, wherein the providing the first cryptographic key comprises providing the communications device with the first cryptographic key via a communications channel distinct from the first communications channel.

13. The method according to claim 9, wherein the message processor is in communication with an authorized user database of authorized users, the first authorization message includes a first user identifier, and the receiving a first authorization message comprises the message processor validating the first user identifier against the authorized user database.

14. The method according to claim 13, wherein the second authorization message includes a second user identifier, and the receiving a second authorization message comprises validating the second user identifier against the authorized user database.

15. The method according to claim 9, wherein the first data pointer identifies a payer financial institution, the first authorization message identifies a payee financial institution, and the validating the first data pointer comprises transmitting to a computer server a funds transfer authorization including the first data pointer and authorizing a funds transfer from the payer financial institution to the payee financial institution in an amount of the second data value, and receiving from the computer server a confirmation of the funds transfer in the amount of the second data value.

16. The method according to claim 15, wherein the validating the second data pointer comprises the message processor transmitting to the computer server a funds transfer authorization authorizing including the second data pointer and authorizing a funds transfer from the payer financial institution to the payee financial institution in an amount of the third data value, and receiving from the computer server a confirmation of the funds transfer in the amount of the third data value.

* * * * *